United States Patent Office 3,549,591
Patented Dec. 22, 1970

3,549,591
POLYFLUOROEPOXIDES AND EPOXY RESINS CONTAINING FLUORINE ON THE AROMATIC CARBON STRUCTURE AND PROCESS
James R. Griffith, Riverdale Heights, Md., assignor to the United States of America as represented by the Secretary of the Navy
No Drawing. Filed July 30, 1968, Ser. No. 748,589
Int. Cl. C08g 30/04, 30/12
U.S. Cl. 260—47                                    18 Claims

ABSTRACT OF THE DISCLOSURE

New diglycidyl ethers of polyhydroxy phenols, having all available aromatic hydrogen atoms substituted by fluorine are useful for producing polyfluorinated epoxy resins having an improved water resistance. The new polyfluoroepoxides have the formula:

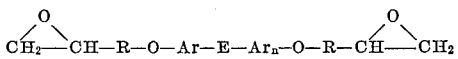

where:
R is lower alkylene hydrocarbon radical;
Ar is a perfluorinated aromatic hydrocarbon radical;
E is the radical

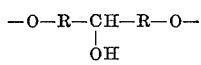

$n$ an integer, is zero or more, with the proviso that $n$ is zero when Ar is perfluorobiphenyl.

Preferred curing agents for the new ethers have the formula:

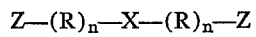

where:
X is a perfluorinated hydrocarbon radical;
R is a hydrocarbon radical selected from the group consisting of methylene, ethylene, phenylene and lower alkyl derivatives thereof;
$n$ is the integer 0 or 1 and wherein X is perfluorophenyl and perfluorobiphenyl when $n$ is zero;
Z is an epoxy curing radical.

A specific example of a useful resin is the reaction product of 4,4'-dihydroxy-octafluorobiphenyl diglycidyl ether and tetrafluoro-m-phenylene diamine.

---

The invention described herein may be manufactured and used by or for the Government of the United States of America for governmental purposes without the payment of any royalties thereon or therefor.

BACKGROUND OF THE INVENTION

Field of the invention

The present invention relates generally to improved epoxy resins, and more particularly pertains to new and improved polyfluoroepoxides, namely diglycidyl ethers of polyhydroxy phenols, having all available aromatic hydrogen atoms substituted by fluorine. The new ethers are cured with polyfunctional epoxide curing agents, preferably a curing agent having a perfluorinated hydrocarbon nucleus, to yield epoxy plastics with improved resistance to water.

Description of the prior art

In the field of filament winding, it has been general practice to employ epoxy resins as binders. Filament wound articles, prepared with conventional epoxy resins, exhibit undesirable changes in physical properties in the presence of water or water vapor. Water diffuses into the epoxy resin and in effect lubricates the internal structure in a manner believed similar to that of plasticizers. All moduli such as tensile, compressive, or flexural strength of the epoxy resin decrease. Water causes a general reduction in the adhesiveness of the epoxy. Cohesiveness of manufactured articles is reduced. In addition to the adverse effect of water on conventional epoxies, many of these plastics are combustible at high temperature.

SUMMARY OF THE INVENTION

The polyfluoroepoxides produced from the novel polyglycidyl ethers of polyhydroxy phenols, having all available aromatic hydrogen atoms substituted by fluorine, have exceptional resistance to diffusion of water, and exhibit improved tensile strength, flexural, and compressive strength in the presence of water. Adhesiveness is improved considerably by a reduction in the adverse effect of water on epoxy-substrate bonds and by formation of initially better bonds with the substrate due to the low surface tension of the resins. In addition, the new resins have exceptional flame resistance with some incapable of supporting combustion.

The diglycidyl ethers and resins of this invention are particularly useful for fabricating coatings and glass fiber wound objects and are generally useful wherever water resistance, tough, non-flammable coatings are desired. Another advantage of the present diglycidyl ethers is their property of curing with various conventional and fluorinated curing agents to produce either thermosetting, thermoplastic, or elastomeric type compounds.

An object of the present invention is to provide improved water resistant epoxy resins having fluorine atoms substituted for all hydrogen atoms connecting to the aromatic ring of the new compound.

Another object is to provide epoxy resin having appreciably lower surface tensions.

A further object of the invention is the provision of improved surface wetting and adhesive strength.

DESCRIPTION OF THE PREFERRED EMBODIMENTS

The polyglycidyl ethers useful in the practice of this invention, are the diglycidyl ethers of aromatic dihydroxy compounds, having all available aromatic hydrogen atoms substituted by fluorine, for example, tetrafluorodiphenols such as tetrafluororesorcinol, dihydroxyoctafluorobiphenyls such as 4,4' - dihydroxyoctafluorobiphenyl and the like.

The new ethers may be cured with any of standard of epoxy curing agents, such as, aliphatic and aromatic polyamines, polybasic organic acids and acid anhydrides, tertiary amines, inorganic acids, many organic compounds with two or more active hydroen atoms, most Lewis acids and Lewis bases, and the like. Particularly preferred are polyfluorinated epoxy curing agents having a perfluorinated aliphatic or aromatic nucleus. Such curing agents have the formula:

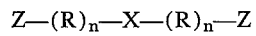

where:
X is a fluorinated hydrocarbon radical selected from the group consisting of perfluorophenyl, -biphenyl and -alkylene,
R is a hydrocarbon radical selected from the group consisting of methylene, ethylene, phenylene and lower alkyl derivatives thereof,
$n$ is an integer of 0 or 1 and wherein X is perfluorophenyl and perfluorobiphenyl when $n$ is zero, Z is an epoxy curing radical selected from the group consisting of

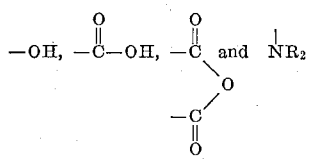

where R' is hydrogen or lower alkyl and with the further proviso that X is perfluorophenyl and -phenyl when Z is

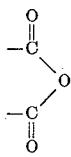

By perfluorinated nucleus I mean a bivalent aliphatic or aromatic hydrocarbon radical wherein all the hydrogen atoms have been replaced by fluorine atoms and wherein the two valences are directly attached to a hydrocarbon radical (R) used to separate the perfluorinated nucleus from the reactive terminal curing groups.

Specific examples of the above perferred polyfluorinated epoxy curing agents are:

Aliphatic polyamines having at least one carbon atom completely fluorinated and that carbon being separated from the reactive curing radical by a hydrocarbon group such as methylene, ethylene, phenylene or lower alkyl (one to six carbon) derivatives thereof, such as 3,3,4,4 tetrafluoro-1,6 hexane diamine, 2,2,3,3,4,4,5,5-octafluoro-1,6 hexane diamine, 1,4-dipropyl-2,2,3,3 tetrafluoro-1,4 butane diamine, 2,2 di - fluoro - 1,3 propane di(methylamine) 3,3-difluoro-1,5-pentane diamine, 1,3-bis(4,4' diaminophenylene) 1,2,2,3 tetrafluoropropane and the like.

Perfluorinated aromatic polyamines such as tetrafluoro-m-phenylene diamine, tetrafluoro-p-phenylene diamine, 4,4'-diamine octafluorobiphenyl, or the like;

Polybasic aromatic organic acids and anhydrides, such as, difluoropyromellitic dianhydride, tetrafluoroisophthalic acid, 4,4' octafluoro-biphenyl dicarboxylic acid, hexafluorobiphenyl-3,3',4,4'-tetracarboxylic acid, and the like;

Polybasic aliphatic organic acids such as 3,3-difluoro-1,5 pentane dioic acid, 2,2,3,3,4,4,5,5-octafluoro-1,6 hexane dioic acid, 1,1,4,4 - tetrahydro 2,2,3,3 tetrafluoro - 1,4-butane dioic acid, perfluoropentylene dibenzoic acid and the like;

Polyhydroxy perfluorinated aliphatic hydrocarbons such as perfluoromethylbisphenol A, 2,2,3,3,4,4-hexafluoro-1, 5-pentanediol, 3,3,4,4-tetrafluoro - 1,6 - hexane diol, perfluoropropylene diphenol, 1,4 dipentyl 2,2,3,3 tetrafluoro-1,4 butane diol and the like;

Polyhydroxy perfluorinated aromatic hydrocarbons, such as tetrafluororesorcinol, tetrafluorohydroquinone, 4,4'-dihydroxyoctafluorobiphenyl, and the like.

Also useful are polyfunctional polyfluorinated curing agent, wherein the reactive terminal curing groups differ, for example, 4-amino, 4' - hydroxy - octafluorobiphenyl, 1-amino, 3-hydroxy-tetrafluorobenzene, hydroxy, 2,2,3,3, 4,4,5,5-octafluoro-6-amino hexane, or the like.

The new diglycidyl ethers are prepared by reacting, in the presence of aqueous base, epichlorohydrin or other suitable oxirane compound having a 1,2 epoxy ring, with a polyhdroxy phenol, having all aromatic hydrogen atoms substituted by fluorine atoms. A solvent, such as methanol, acetone or other water soluble organic material may be added to help maintain reactants in solutions in the aqueous phase.

The reaction is carried out at ambient pressure with step-wise addition of caustic under reflux. When treating diphenols the reaction is quite exothermic and may require cooling instead of reflux during addition of the caustic. From two to thirty equivalents, preferably ten to fifteen equivalents of the oxirane are used per equivalent of the perfluoropolyhydroxy phenol. From one to 1.1 of caustic are employed.

After reaction time of one hour or more, the phases are separated and the aqueous phase discarded.

The resulting ether material is stripped of excess oxirane and solvent of filtered, if necessary, to remove solid residues. Methanol, acetone, benzene or other suitable solvent may be added if desired, to dilute the ether prior to filtration. The filtered solution is concentrated under vacuum and may be molecularly distilled to prepare purer ethers.

The new diglycidyl ethers are cured with any conventional epoxy curing agents, preferably with a curing agent having a perfluorinated nucleus as previously described. In general, the epoxy resin is prepared by blending the diglycidyl ether and curing agent in such ratios that there is 1:1 equivalent epoxide functional groups and reaction curing agent hydrogens. In practice the ratio of epoxide and curing agent may be from 90 to 110 percent of theoretical equivalent. The blend is maintained at room temperature or above, say to 100° C. until a gel forms. Reaction time to the "B" stage depends on the temperature selected. The B stage gel is then cured by heating between 100°–180° C. for 2 hours to 10 hours. A final cure is usually necessary at 140° C. to 180° C. for 12 hours to 24 hours, preferably at 160° C. for 16 hours. For very high molecular weight intermediates, higher blending and curing temperature may be necessary, as well as longer curing times.

Where the intermediate reactants are solids at room temperature the diglycidyl ethers and curing agent may be separately powdered and mixed to form a solid mixture which may be stored indefinitely and is cured by simply heating to reaction temperature. If one or more of the reactants are in liquid form they are preferably blended below 100° C. to prevent excessively rapid curing.

The following specific examples are included as typical of the method by which the novel epoxies and resins of this invention are made, but are not intended to limit the scope of the invention.

EXAMPLE 1

77 g. (0.23 mole) of 4,4'-dihydroxy octafluorobiphenyl (which can be prepared according to the procedure described in Chemical Abstracts 62:9040d, 1965), 215 g. (2.33 mole) of epichlorohydrin, 215 g. acetone and 30 g. of water are placed in a 1000 ml. three-necked flask fitted with a mechanical stirrer, reflux condenser and addition funnel. The solution is stirred and heated to reflux while 20.5 g. (0.513 mole) NaOH in a 20% solution in distilled water is added in increments, ⅕ the volume, every fifteen minutes. After the fifth addition, the phases are allowed to separate and the aqueous layer is drawn off and discarded. The last addition of alkali is made, 15 minutes reflux is continued, and the aqueous phase is again removed. The resulting solution is stripped of acetone and excess epichlorohydrin in a rotary evaporator. 250 ml. of absolute methanol is added to the residue to dissolve all but precipitated sodium chloride. Methanol is removed by filtration, and the clear filtrate solution is cooled to about −10° C. to crystallize. Three additional recrystallization yielded a white, somewhat waxy, crystalline material, M.P. 75–77° C.

Theoretical analysis.—C, 48.88%; F, 34.36%; H, 2.28%. Epoxy equivalent weight 221. Found: C, 49.15%; F, 34.43%; H, 2.50%. Epoxy equivalent weight 242.

EXAMPLE 2

Synthesis of tetrafluororesorcinol diglycidyl ether 30.0 g. (0.165 mole) tetrafluororesorcinol (which can be prepared according to the procedure described by Pummer and Wall, Journal of Research of the National Bureau of Standards, volume 68A, No. 3, p. 277, May–June 1964). 213 g. (2.31 mole) epichlorohydrin and 1 ml. of water are placed into a 1-necked, round-bottom flask (500 ml.) and stirred with a magnetic stirrer. The reaction is requiring exothermic cooling in a water bath. 16 g. (0.4 mole) of sodium hydroxide is added over a 2 hour period to the stirred solution. It is then heated to 110° for an additional two hours and allowed to stand at room temperature for 16 hours. Excess epichlorohydrin is removed on a rotary evaporator. The residue is extracted with 100 ml. of boiling benzene, and a chocolate-brown residue filtered and discarded. The filtrate is evaporated in the rotary evaporator. The filtrate residue is passed through a molecular still at 100° C. and 200–300 microns Hg pressure to strip remaining solvent and epichlorohydrin, 48 g. of a brown viscous residue is obtained. This residue is distilled at 180° C. and 200 microns to yield a slightly yellow liquid product.

*Theoretical analysis (monomer)*.—C, 48.98%; F, 25.83%; H, 3.42%. Epoxy equivalent weight 147. Found: C, 48.05%; F, 22.69%; H, 5.02. Epoxy equivalent weight, 250.

The recovered tetrafluororesorcinol diglycidyl ether is a mixture of monomer and polymer predominately the dimer.

EXAMPLE 3

Cure of octafluorobiphenyl 4,4′ diglycidyl ether with tetrafluoro-m-phenylene diamine A stoichiometric quantity of the diglycidyl ether (0.23 g.) and the diamine (0.042) are dissolved together on a warm hot plate by melting. The solution is heated to 80° C. for 24 hours during which time the plastic gelled. Intermediate cure is used from six hours at 140° and a final cure is made at 160° C. for 16 hours. The product is a dark brown, strong thermo plastic.

EXAMPLE 4

Cure of tetrafluororesorcinol diglycidyl ether with tetrafluoro-m-phenylene diamine A stoichiometric quantity of the diglycidyl ether (25.0 g.) and diamine (4.5 g.) are dissolved at about room temperature and stored with gelation. The gelled resin is then cured for six hours at 140° C. and 16 hours at 160° C. The product is a brown thermo setting resin.

EXAMPLE 5

Cure of tetrafluororesorcinol diglycidyl ether with 2,2,3,3,4,4,5,5-octafluoro-1,6 hexane diamine A stoichiometric quantity of the ether and diamine are mixed and a solution found. The solution is maintained at 25° C. until gelation occurs. Curing is done at 125° C. for three hours and 140° C. for three hours. The cured plastic is a thermo setting useful for fabricating water resistant coatings and fiber wound articles.

EXAMPLE 6

Cure of octafluorobiphenyl 4,4′ diglycidyl ether with 4,4′-dihydroxy octafluorobiphenyl 0.66 g. of the ether and 0.66 g. of its diphenolic intermediate are melted and blended to form a solution. The mixture is cured at 100° C. for two hours, 120° C. for twenty hours, and 165° C. for twenty-four hours. The resulting, cured plastic is a clear, light brown thermo plastic soluble in acetone. The plastic is useful in films and extrusions in which the aromatic fluorine atoms improve wetting and temperature stability relative to hydrocarbon analogs.

EXAMPLE 7

Cure of octafluorobiphenyl 4,4′ diglycidyl ether with 2,2,3,3,4,4-hexafluoro-1,5-pentane diol 1.25 g. of the epoxy and 0.5 g. of the diol are melted together in a closed vial. The mixture is cured at 90° C. for 20 hours, 120° C. for 20 hours, and 165° C. for 24 hours. The product is a tough, light-brown elastomeric plastic. (The plastic is useful for fabricating seals and gaskets having excellent resistance to water and hydrocarbons.)

When the new diglycidyl ethers of perfluoropolyhydroxyphenols are cured with fluorinated epoxy curing agents, a new class of fluorinated epoxy resins is produced. These resins being extremely resistant to sorption of water and exhibit physical properties which are not appreciably changed by the action water. Most significant properties of these resins are the excellent tensile, compressive and flexural strength and adhesiveness of the resins in the presence of water.

Another advantageous characteristic of the polymers of this invention, is that the type of plastic produced may be varied by the curing agent employed. For instance, where polyfluorinated amines are employed thermosetting epoxy resins are produced, that are extremely useful for producing Fiberglas wound articles. Where perfluorinated dihydroxyphenol curing agents are employed, thermoplastic epoxy resins are produced for use in films and coatings where improved stability and temperature resistance is desired. Where polyfluorinated hydrocarbon diols are employed elastomeric plastics are produced, having uses as seals and gaskets.

What is claimed and desired to be secured by Letters Patent of the United States is:

1. Polyfluoroepoxides of the formula:

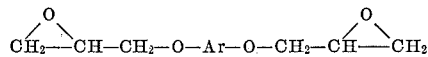

where Ar is a fluorinated hydrocarbon radical selected from the group consisting of perfluorophenylene and perfluorobiphenylene.

2. The perfluoroepoxide of claim 1, in which the compound is tetrafluorooresorcinol diglycidyl ether.

3. The polyfluoroepoxide of claim 1, in which the compound is 4,4′-dihydroxy-octafluorobiphenyl diglycidyl ether.

4. A resin composition comprising a polyfluoroepoxide of the formula:

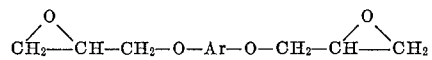

wherein Ar is a fluorinated hydrocarbon radical selected from the group consisting of perfluorophenylene and perfluorobiphenylene, and a polyfunctional epoxide curing agent.

5. The composition of claim 4, in which the polyfunctional epoxide curing agent is of the formula:

$$Z—(R)_n—X—(R)_n—Z$$

where X is a fluorinated hydrocarbon radical selected from the group consisting of perfluorophenylene, perfluorobiphenylene, and perfluoroalkylene, where R is a hydrocarbon radical selected from the group consisting of methylene, ethylene, phenylene and lower alkyl derivatives thereof; n, an integer, is 0 to 1 and where Z is an epoxide curing radical selected from the group consisting of

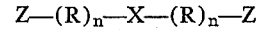

and NR′₂, where R′ is selected from the group consisting of hydrogen and lower alkyl, provided that when n is zero X is selected from the group consisting of perfluorophenylene and perfluorobiphenylene; and further provided that when X is selected from the group consisting of perfluorophenylene and perfluorobiphenylene, n is 0; provided that when Z is

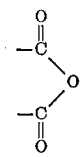

$n$ is 0 and X is selected from the group consisting of

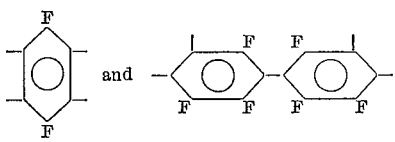

6. The composition of claim 4, in which the polyfunctional epoxide curing agent is of the formula:

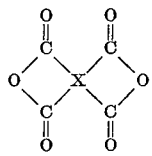

where X is a tetravalent radical selected from the group consisting of

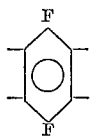

and

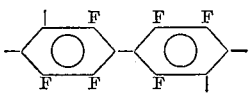

7. The composition of claim 5, in which the polyfluoroepoxide is 4,4'-dihydroxyoctafluorobiphenyl diglycidyl ether.

8. The composition of claim 7, in which the curing agent is an aromatic diamine.

9. The composition of claim 8, in which the curing agent is tetrafluoro-m-phenylene diamine.

10. The composition of claim 7, in which Z of the curing agent is —OH.

11. The composition of claim 10, in which the curing agent is 4,4'-dihydroxyoctafluorobiphenyl.

12. The composition of claim 10, in which the curing agent is a perfluoroalkanediol in which R is methylene, $n$ is one, and X is perfluoroalkylene having one or more carbon atoms.

13. The composition of claim 5, in which the polyfluoroepoxide is a diglycidyl ether of tetrafluororesorcinol.

14. A process for producing an epoxy resin having improved water resistance comprising reacting a mixture of a diglycidyl ether of a dihydroxy phenol having all available aromatic hydrogen atoms substituted by fluorine with a polyfunctional epoxy curing agent for a time sufficient to cure the resin.

15. The process of claim 14, in which the epoxy curing agent is of the formula:

$$Z—(R)_n—X—(R)_n—Z$$

where; X is a fluorinated hydrocarbon radical selected from the group consisting of perfluorophenylene, perfluorobiphenylene, and perfluoroalkylene, where R is a hydrocarbon radical selected from the group consisting of methylene, ethylene, phenylene and lower alkyl derivatives thereof; $n$, an integer, is 0 to 1 and where Z is an epoxide curing radical selected from the group consisting of OH,

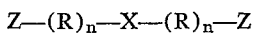

and NR′$_2$, where R′ is selected from the group consisting of hydrogen and lower alkyl, provided that when $n$ is zero, X is selected from the group consisting of perfluorophenylene and perfluorobiphenylene; and further provided that when X is selected from the group consisting of perfluorophenylene, and perfluorobiphenylene, $n$ is 0; provided that when Z is

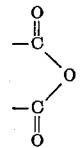

$n$ is 0 and X is selected from the group consisting of

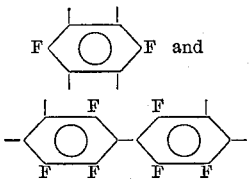

16. The process of claim 14 in which the polyfunctional epoxide curing agent is of the formula,

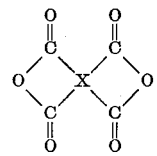

where X is a tetravalent radical selected from the group consisting of

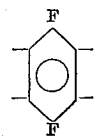

and

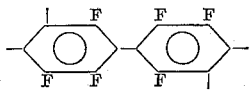

17. The composition of claim 6 in which the polyfluoroepoxide is 4,4'-dihydroxyoctafluorobiphenyl diglycidyl ether.

18. The composition of claim 6 in which the polyfluoroepoxide is a diglycidyl ether of tetrafluororesorcinol.

References Cited

UNITED STATES PATENTS

| 3,004,951 | 10/1961 | Dazzi | 260—47 |
| 3,305,528 | 2/1967 | Wynstra et al. | 260—47 |
| 3,277,048 | 10/1966 | Sonnabend | 260—47 |

WILLIAM H. SHORT, Primary Examiner

EARL A. NIELSON, Assistant Examiner

U.S. Cl. X.R.

117—126; 260—348